United States Patent
Simone et al.

(10) Patent No.: US 9,252,496 B2
(45) Date of Patent: *Feb. 2, 2016

(54) METHODS AND COMPOSITIONS FOR ENERGY DISSIPATION

(71) Applicant: SABIC Global Technologies B.V., Bergen op Zoom (NL)

(72) Inventors: Davide Louis Simone, Saratoga Springs, NY (US); Gary Stephen Balch, Ballston Spa, NY (US); David Alexander Gibson, III, Scotia, NY (US); Harold Jay Patchen, Ballston Lake, NY (US); Allen Lawrence Garner, Clifton Park, NY (US); Gregory John Parker, San Jose, CA (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 263 days.

This patent is subject to a terminal disclaimer.

(21) Appl. No.: 13/739,559

(22) Filed: Jan. 11, 2013

(65) Prior Publication Data

US 2014/0197978 A1     Jul. 17, 2014

(51) Int. Cl.
*H01Q 17/00* (2006.01)
*H01Q 15/14* (2006.01)
*C08K 3/04* (2006.01)

(52) U.S. Cl.
CPC *H01Q 15/14* (2013.01); *C08K 3/04* (2013.01); *H01Q 17/002* (2013.01); *C08K 2201/011* (2013.01)

(58) Field of Classification Search
CPC .............................. H01Q 17/00; H01Q 17/008

USPC ......................................................... 342/1–5
See application file for complete search history.

(56) References Cited

U.S. PATENT DOCUMENTS

| | | | |
|---|---|---|---|
| 5,578,359 A | 11/1996 | Forbes | |
| 7,612,138 B2 | 11/2009 | Kuznetsov | |
| 8,610,617 B1 * | 12/2013 | Avouris | H01Q 17/00 342/13 |
| 2003/0146866 A1 * | 8/2003 | Hayashi et al. | 342/1 |
| 2004/0021597 A1 * | 2/2004 | Dvorak | H01Q 17/008 342/1 |
| 2006/0241236 A1 | 10/2006 | Kuznetsov | |
| 2009/0135042 A1 | 5/2009 | Umishita | |

(Continued)

FOREIGN PATENT DOCUMENTS

| | | |
|---|---|---|
| WO | WO 2010/115173 A1 | 10/2010 |
| WO | WO 2013/182793 A1 | 12/2013 |
| WO | WO 2014/061048 A2 | 4/2014 |

OTHER PUBLICATIONS

Huang, et al. (1985) Electromagnetic shielding properties of amorphous alloy shields for cathode ray tubes. J. Appl. Phys., 57(1): 3517-3519.

(Continued)

*Primary Examiner* — Timothy A Brainard
(74) *Attorney, Agent, or Firm* — Baker Hostetler LLP

(57) ABSTRACT

A composition for energy dissipation in at least a portion of the frequency range from about 1 GHz to about 20 GHz, the composition can comprise a dielectric and graphene mixed with at least a portion of the dielectric, wherein the percentage volume of the graphene relative to the total volume of the composition is configured such that dissipation of incident electromagnetic radiation is substantially optimized in at least a portion of the frequency range from about 1 GHz to about 20 GHz.

26 Claims, 6 Drawing Sheets

Permittivity vs volume loading

(56) References Cited

U.S. PATENT DOCUMENTS

| | | |
|---|---|---|
| 2010/0096181 A1 | 4/2010 | Nakamura |
| 2010/0149078 A1 | 6/2010 | Kim |
| 2011/0160372 A1 | 6/2011 | Youm et al. |
| 2011/0178224 A1 | 7/2011 | Pan |
| 2011/0260904 A1* | 10/2011 | Fukuda et al. ............... 342/1 |

OTHER PUBLICATIONS

Metglas Magnetic Alloy 2705M (cobalt based) Technical Bulletin. Ref: 2705M03092009.

* cited by examiner

METHODS AND COMPOSITIONS FOR ENERGY DISSIPATION

BACKGROUND

Electromagnetic (EM) radiation attenuating technology is useful for a wide variety of military and civilian applications ranging from minimizing the Radar signature of a target to EM shielding in consumer electronics. EMI (Electromagnetic Interference) shielding of electronic systems to decrease susceptibility to, and radiation from, EM sources is increasingly important in various applications, in particular at/in the radio to microwave wavelengths.

SUMMARY

It is to be understood that both the following general description and the following detailed description are exemplary and explanatory only and are not restrictive, as claimed. Provided are methods and compositions for energy dissipation. As an example, the methods and compositions can optimize the absorption, reflection, transmission of graphene filled composite materials over the 1-20 GHz frequency range.

In an aspect, a graphene filler, being electrically conductive, can operate as a lossy (i.e. large imaginary permittivity) additive into thermoplastic resins. As an example, when the concentration of graphene increases in a composition the percolated nature of electrical conduction can be achieved. Accordingly, the composition structure can provide shielding effectiveness (e.g., lack of transmission). In an aspect, a conductive filler (e.g., graphene) can be extruded using a twin screw extruder, single screw extruder, injection molding, or compression molding, or a combination thereof.

In an aspect, a composition for energy dissipation in at least a portion of the frequency range from about 1 GHz to about 20 GHz can comprise a dielectric and a conductive filler such as graphene. As an example, graphene can be mixed with at least a portion of the dielectric, wherein the percentage volume of the graphene relative to the total volume of the composition is configured such that dissipation of incident electromagnetic radiation is substantially optimized in at least a portion of the frequency range from about 1 GHz to about 20 GHz.

In an aspect, a composition for energy dissipation in at least a portion of the frequency range from about 1 GHz to about 20 GHz can comprise a dielectric and a conductive, non-magnetic filler mixed with at least a portion of the dielectric. As an example, the percentage volume of the conductive, non-magnetic filler relative to the total volume of the composition is configured such that dissipation of incident electromagnetic radiation is substantially optimized in at least a portion of the frequency range from about 1 GHz to about 20 GHz.

In an aspect, a composition for energy dissipation in at least a portion of the frequency range from about 1 GHz to about 20 GHz can comprise a dielectric and a conductive filler having variable permittivity and substantially static permeability. As an example, the conductive filler can be mixed with at least a portion of the dielectric. As a further example, the percentage volume of the conductive filler relative to the total volume of the composition is configured such that dissipation of incident electromagnetic radiation is substantially optimized in at least a portion of the frequency range from about 1 GHz to about 20 GHz. As a further example, below full electrical percolation, the reflectivity of the composition can be minimized.

In an aspect, a method of increasing energy dissipation in at least a portion of the frequency range from about 1 GHz to about 20 GHz can comprise providing a composition and receiving, at the composition, incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
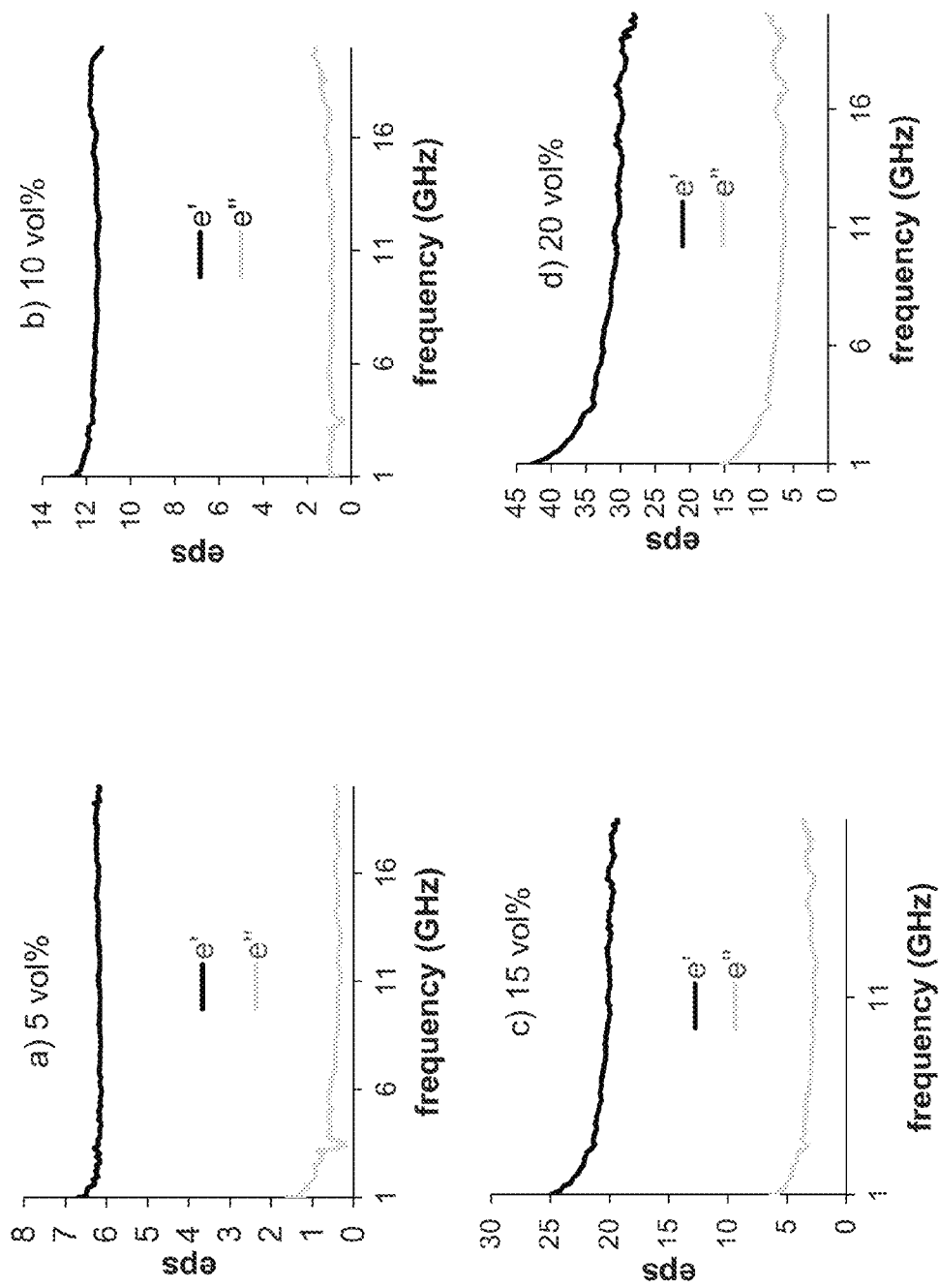
FIG. 1 is a graphical representation of permittivity and permeability properties of an exemplary composition comprising various filler loadings from about 5 vol % to about 20 vol % graphene in ABS.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. All ranges disclosed herein are inclusive and combinable (e.g., ranges of "up to 25 volume %, or, more specifically 5 volume % to 20 volume %" is inclusive of the endpoints and all intermediate values of the ranges of "5 volume % to 25 volume %," etc.).

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

As used herein, the term "effective amount" refers to an amount that is sufficient to achieve the desired modification of a physical property of the composition or material. For example, an "effective amount" of a recycled polycarbonate blend refers to an amount that is sufficient to achieve the desired improvement in the property modulated by the formulation component, e.g. splaying, under applicable test conditions and without adversely affecting other specified properties. The specific level in terms of wt % and/or volume % in a composition required as an effective amount will depend upon a variety of factors including the amount and type of recycled polycarbonate blend, amount and type of virgin polycarbonate polymer compositions, amount and type of impact modifier compositions, including virgin and recycled impact modifiers, and end use of the article made using the composition.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule. A-D is disclosed, then even if each is not individually recited each is individually and collectively contemplated meaning combinations. A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

References in the specification and concluding claims to parts by volume, of a particular element or component in a composition or article, denotes the volume relationship between the element or component and any other elements or components in the composition or article for which a part by volume is expressed. Thus, in a compound containing 2 parts by volume of component X and 5 parts by volume component Y, X and Y are present at a volume ratio of 2:5, and are present in such ratio regardless of whether additional components are contained in the compound.

A weight percent of a component, unless specifically stated to the contrary, is based on the total volume of the formulation or composition in which the component is included. For example if a particular element or component in a composition or article is said to have 8% by volume, it is understood that this percentage is relative to a total compositional percentage of 100% by volume.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

As used herein, the term "ABS" or "acrylonitrile-butadiene-styrene copolymer" refers to an acrylonitrile-butadiene-styrene polymer which can be an acrylonitrile-butadiene-styrene terpolymer or a blend of styrene-butadiene rubber and styrene-acrylonitrile copolymer.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

In an aspect, a graphene filler, being electrically conductive, can operate as a lossy (i.e. large imaginary permittivity) additive into thermoplastic resins. As an example, when the concentration of graphene increases in a composition the percolated nature of electrical conduction can be achieved. Accordingly, the composition structure can provide shielding effectiveness (e.g., lack of transmission).

In an aspect, provided is a composition for energy dissipation. As an example, the energy dissipation can be in at least a portion of the frequency range from about 1 GHz to about 20 GHz. As a further example, the composition can comprise a dielectric and conductive filler.

In an aspect, the dielectric can comprise a thermoplastic polymer. As an example, various thermoplastic resins such as polypropylene, polyethylene, polystyrene, polyvinyl chloride, polyacetal, polyethylene terephthalate, polycarbonate, polyvinyl acetate, polyamide, polyamide imide, polyether imide, polyether ether ketone, polyvinyl alcohol, poly phenylene ether, poly(meth)acrylate, and liquid crystal polymer, and various thermosetting resins such as epoxy resin, vinyl ester resin, phenol resin, unsaturated polyester resin, furan resins, imide resin, urethane resin, melamine resin, silicone resin and urea resin; as well as various elastomers such as natural rubber, styrene butadiene rubber (SBR), butadiene rubber (BR), polyisoprene rubber (IR), ethylene-propylene rubber (EPDM), nitrile rubber (NBR), polychloroprene rubber (CR), isobutylene isoprene rubber (IIR), polyurethane rubber, silicone rubber, fluorine rubber, acrylic rubber (ACM), epichlorohydrin rubber, ethylene acrylic rubber, norbornene rubber and thermoplastic elastomer can be enumerated as the dielectric. Furthermore, the dielectric may be in various forms of composition, such as adhesive, fibers, paint, ink, etc. As a further example, the dielectric can comprise acrylonitrile butadiene styrene. As used herein, the term "ABS" or "acrylonitrile-butadiene-styrene copolymer" refers to an acrylonitrile-butadiene-styrene polymer which can be an acrylonitrile-butadiene-styrene terpolymer or a blend of styrene-butadiene rubber and styrene-acrylonitrile copolymer.

In an aspect, the conductive filler can comprise conductive, non-magnetic filler. As an example, the conductive filler can comprise a variable permittivity and substantially static permeability. As a further example, the conductive filler can comprise graphene.

In an aspect, graphene can comprise a single planar sheet of covalently bonded carbon atoms. As an example, graphene can be formed of a plane of carbon atoms comprising sp2-bonded carbon forming a regular hexagonal lattice with an aromatic structure. As a further example, graphene can comprise hybrid orbitals formed by sp2 hybridization. In an aspect, in the sp2 hybridization, the 2s orbital and two of the three 2p orbitals mix to form three sp2 orbitals. The one remaining p-orbital forms a pi-bond between the carbon atoms. Similar to the structure of benzene, the structure of graphene can comprise a conjugated ring of the p-orbitals which exhibits a stabilization that is stronger than would be expected by the stabilization of conjugation alone, i.e., the graphene structure is aromatic. Other structures, forms, and/or layers of graphene can be used. Materials exhibiting similar permittivity and permeability properties to that of graphene can be used.

In an aspect, graphene can be mixed with at least a portion of the dielectric, wherein the percentage volume of the graphene relative to the total volume of the composition is configured such that dissipation of incident electromagnetic radiation is substantially optimized in at least a portion of the frequency range from about 1 GHz to about 20 GHz. As an example, the percentage volume of the quantity of graphene relative to the total volume of the composition is from about 5% to about 20%. As another example, the percentage volume of the quantity of graphene relative to the total volume of the composition is from about 10% to about 20%. As a further example, the percentage volume of the quantity of graphene relative to the total volume of the composition is from about 15% to about 20%. In an aspect, a thickness of the composition is configured to minimize transmission of the incident electromagnetic radiation.

As an example, the percentage volume (vol %) of the dielectric relative to the total volume of the composition can be from about 80% to about 95%. As another example, the percentage volume of the dielectric relative to the total volume of the composition can be from about 80% to about 90%. As a further example, the percentage volume of the dielectric relative to the total volume of the composition can be from about 80% to about 85%.

As an example, the percentage volume of the quantity of graphene relative to the total volume of the composition is from about 5% to about 20% and the percentage volume (vol %) of the dielectric relative to the total volume of the composition can be from about 80% to about 95%. As another example, the percentage volume of the quantity of graphene relative to the total volume of the composition is from about 10% to about 20% and the percentage volume of the dielectric relative to the total volume of the composition can be from about 80% to about 90%. As a further example, the percentage volume of the quantity of graphene relative to the total volume of the composition is from about 15% to about 20% and the percentage volume of the dielectric relative to the total volume of the composition can be from about 80% to about 85%.

In an aspect, the conductive filler (e.g., graphene), being electrically conductive, acts as a lossy (large imaginary permittivity) additive into the dielectric. As an example, as the concentration of conductive filler increases, the percolated nature of electrical conduction can be achieved providing a composite structure with good shielding effectiveness (i.e. lack of transmission).

In an aspect, a method of increasing energy dissipation in at least a portion of the frequency range from about 1 GHz to about 20 GHz can comprise providing a composition and receiving, at the composition, incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

The present disclosure comprises at least the following embodiments.

Embodiment 1

A composition for energy dissipation in at least a portion of the frequency range from about 1 GHz to about 20 GHz, the composition comprising: a dielectric; and graphene mixed with at least a portion of the dielectric, wherein the percentage volume of the graphene relative to the total volume of the composition is configured such that dissipation of incident electromagnetic radiation is substantially optimized in at least a portion of the frequency range from about 1 GHz to about 20 GHz.

Embodiment 2

The composition of embodiment 1, wherein the dielectric comprises a thermoplastic polymer.

Embodiment 3

The composition of any of embodiments 1-2, wherein the percentage volume of the quantity of graphene relative to the total volume of the composition is from about 5% to about 20%.

Embodiment 4

The composition of any of embodiments 1-2, wherein the percentage volume of the quantity of graphene relative to the total volume of the composition is from about 10% to about 20%.

Embodiment 5

The composition of any of embodiments 1-2, wherein the percentage volume of the quantity of graphene relative to the total volume of the composition is from about 15% to about 20%.

Embodiment 6

The composition of any of embodiments 1-5, wherein a thickness of the composition is configured to minimize transmission of the incident electromagnetic radiation.

Embodiment 7

A method of increasing energy dissipation in at least a portion of the frequency range from about 1 GHz to about 20 GHz, the method comprising: providing the composition of any of embodiments 1-6; and receiving incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

Embodiment 8

A composition for energy dissipation in at least a portion of the frequency range from about 1 GHz to about 20 GHz, the composition comprising: a dielectric; and a conductive, non-magnetic filler mixed with at least a portion of the dielectric, wherein the percentage volume of the conductive, non-magnetic filler relative to the total volume of the composition is configured such that dissipation of incident electromagnetic radiation is substantially optimized in at least a portion of the frequency range from about 1 GHz to about 20 GHz.

Embodiment 9

The composition of embodiment 8, wherein percentage volume of the conductive filler relative to the total volume of the composition is configured such that the electrical percolation of the material is substantially optimized in at least a portion of the frequency range from about 1 GHz to about 20 GHz.

Embodiment 10

The composition of any of embodiments 8-9, wherein the dielectric comprises a thermoplastic polymer.

Embodiment 11

The composition of any of embodiments 8-10, wherein the conductive filler comprises a lossy filler.

Embodiment 12

The composition of any of embodiments 8-10, wherein the conductive filler comprises graphene.

Embodiment 13

The composition of any of embodiments 8-12, wherein the percentage volume of the conductive filler relative to the total volume of the composition is from about 5% to about 20%.

Embodiment 14

The composition of any of embodiments 8-12, wherein the percentage volume of the conductive filler relative to the total volume of the composition is from about 10% to about 20%.

Embodiment 15

The composition of any of embodiments 8-12, wherein the percentage volume of the conductive filler relative to the total volume of the composition is from about 15% to about 20%.

Embodiment 16

The composition of any of embodiments 8-12, wherein a thickness of the composition is configured to minimize transmission of incident electromagnetic radiation.

Embodiment 17

A method of increasing energy dissipation in at least a portion of the frequency range from about 1 GHz to about 20

GHz, the method comprising: providing the composition of composition of any of embodiments 8-16; and receiving incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

Embodiment 18

A composition for energy dissipation in at least a portion of the frequency range from about 1 GHz to about 20 GHz, the composition comprising: a dielectric; and a conductive filler having variable permittivity and substantially static permeability, wherein the conductive filler is mixed with at least a portion of the dielectric, wherein the percentage volume of the conductive filler relative to the total volume of the composition is configured such that dissipation of incident electromagnetic radiation is substantially optimized in at least a portion of the frequency range from about 1 GHz to about 20 GHz, and wherein, below full electrical percolation, the reflectivity of the composition is minimized.

Embodiment 19

The composition of embodiment 18, wherein the dielectric comprises a thermoplastic polymer.

Embodiment 20

The composition of any of embodiments 18-19, wherein the conductive filler comprises a lossy filler.

Embodiment 21

The composition of any of embodiments 18-19, wherein the conductive filler comprises graphene.

Embodiment 22

The composition of any of embodiments 18-21, wherein the percentage volume of the conductive filler relative to the total volume of the composition is from about 5% to about 20%.

Embodiment 23

The composition of any of embodiments 18-21, wherein the percentage volume of the conductive filler relative to the total volume of the composition is from about 10% to about 20%.

Embodiment 24

The composition of any of embodiments 18-21, wherein the percentage volume of the conductive filler relative to the total volume of the composition is from about 15% to about 20%.

Embodiment 25

The composition of any of embodiments 18-24, wherein a thickness of the composition is configured to minimize transmission of incident electromagnetic radiation.

Embodiment 26

A method of increasing energy dissipation in at least a portion of the frequency range from about 1 GHz to about 20 GHz, the method comprising: providing the composition of composition of any of embodiments 18-25; and receiving incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

Preparation of the compositions can be performed in accordance with any known method by selecting an optimal method depending on the kind of the dielectric and/or conductive material used, for instance, in the case of a thermoplastic polymer, it may be accomplished by kneading under melted condition, dispersion, extrusion, and the like. The thus obtained compositions according to the present disclosure can remarkably reduce the influence of the electromagnetic waves, when it is processed into a film, a layered material, and/or a casing product for any apparatus and it is used at an appropriate place.

In an aspect, the thus obtained compositions according to the present disclosure can be used to form an enclosure for protecting circuit boards from EM radiation or to protect other electronics from exposure to EM radiation emitted by a discrete electronic component or components. As an example, an enclosure can have any shape that can be molded and can enclose electronic boards ("macroscopic" use) or discrete components ("microscopic use"). Example applications comprise enclosures such as cell phone housings, laptop housings, aircraft skeleta or skin, automobile electronic housings for boards and components, healthcare and related electronics (MRI housings, pacemaker housings), and the like.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The compositions of the present disclosure can be manufactured by various methods. The compositions of the present disclosure can be blended with the aforementioned ingredients by a variety of methods involving intimate admixing of the materials with any additional additives desired in the formulation.

As illustrated in Table 1, an exemplary 5 vol % graphene filler composition comprising about 410.2 g ABS and about 45.0 g of graphene was blended using a two screw extruder.

TABLE 1

| screw design | twin screw feeder #3 (S/N 920931) - mild mixing |  |
|---|---|---|
| material | ABS Cycolac MG47F-NA1000 w/graphene at 5 vol % extrudate |  |
| trial # | 1 |  |
|  | set | Actual (act) |
| temp (C.) - zone 1 (feed) | 220 | 218.6 |
| temp - zone 2 | 220 | 220.4 |

TABLE 1-continued

| | | |
|---|---|---|
| temp - zone 3 | 220 | 220.4 |
| temp - zone 4 | 220 | 221.2 |
| temp - zone 5 | 220 | 219.9 |
| temp - zone 6 (die) | | |
| RPM | 400 | |
| torque (%) | 12.3 | |
| die PSI | 168 | |
| throughput (set) | 6 lb/hr | |
| throughput (act) | 6.0418 | |

As illustrated in Table 2, an exemplary 10 vol % graphene filler composition comprising about 369.3 g ABS and about 85.3 g of graphene was blended using a two screw extruder.

TABLE 2

| screw design | twin screw feeder #3 (S/N 920931) - mild mixing |
| material | ABS Cycolac MG47F-NA1000 w/graphene at 10 vol % extrudate |
| trial # | 1 |

| | set | act |
|---|---|---|
| temp (C.) - zone 1 (feed) | 220 | 219.6 |
| temp - zone 2 | 220 | 219.8 |
| temp - zone 3 | 220 | 220.1 |
| temp - zone 4 | 220 | 221.7 |
| temp - zone 5 | 220 | 220.4 |
| temp - zone 6 (die) | | |
| RPM | 401 | |
| torque (%) | 11.8 | |
| die PSI | 201 | |
| throughput (set) | 6 lb/hr | |
| throughput (act) | 6.0239 | |

As illustrated in Table 3, an exemplary 15 vol % graphene filler composition comprising about 332.4 g ABS and about 121.9 g of graphene was blended using a two screw extruder.

TABLE 3

| screw design | twin screw feeder #3 (S/N 920931) - mild mixing |
| material | ABS Cycolac MG47F-NA1000 w/graphene at 15 vol % extrudate |
| trial # | 1 |

| | set | act |
|---|---|---|
| temp (C.) - zone 1 (feed) | 220 | 219.2 |
| temp - zone 2 | 220 | 220.2 |
| temp - zone 3 | 220 | 220.7 |
| temp - zone 4 | 220 | 222.1 |
| temp - zone 5 | 220 | 221.4 |
| temp - zone 6 (die) | | |
| RPM | 401 | |
| torque (%) | 12.5 | |
| die PSI | 214 | |
| throughput (set) | 6 lb/hr | |
| throughput (act) | 6.0656 | |

As illustrated in Table 4, an exemplary 20 vol % graphene filler composition comprising about 299.3 g ABS and about 155.4 g of graphene was blended using a two screw extruder.

TABLE 4

| screw design | twin screw feeder #3 (S/N 920931) - mild mixing |
| material | ABS Cycolac MG47F-NA1000 w/graphene at 20 vol % extrudate |
| trial # | 1 |

| | set | act |
|---|---|---|
| Temp (C.) - zone 1 (feed) | 220 | 219.2 |
| temp - zone 2 | 220 | 219.9 |
| temp - zone 3 | 220 | 220.7 |
| temp - zone 4 | 220 | 222.8 |
| temp - zone 5 | 220 | 220.4 |
| temp - zone 6 (die) | | |
| RPM | 402 | |
| torque (%) | 12.4 | |
| die PSI | 235 | |
| throughput (set) | 6 lb/hr | |
| throughput (act) | 6.0537 | |

In an aspect, the extrusion extrudate from the blending process illustrated in one or more of Tables 1-4 was compression molded. As an example, compression molding was facilitated by a Tetrahedron MTP-14 press. As a further example, the press was set to about 395 F (~201 C). Accordingly, at desired temp, the composition extrudate was placed in a mold, covered with steel plates, and inserted in the press. Platens can be closed with about 0 lbs force. At the set temperature, with about 0 lbs force, manually compression was provided for a set time (e.g., about 10 min). Press force was increased to about 1000 lbs for about 5 min. Press force was further increased to about 5000 lbs for about 5 min. Press force was further increased to about 10,000 lbs for about 5 min. The press was cooled to a set cooling temperature (e.g., about 180 F) under pressure and the compression molded composition was removed.

FIG. 1 illustrates a graphical representation of permittivity and permeability properties of an exemplary composition having about 2 mm thickness. As shown, the exemplary composite comprises various filler loadings from about 5 vol % to about 20 vol % graphene in ABS. In an aspect, permittivity and permeability of a composite sample should be constant as a function of sample thickness, but should change as a function of filler loading. As an example, difference in values between varied thick composition samples can imply different degrees of filler dispersivity and feed homogeneity. As shown in FIG. 1, as filler loading increases so does the real and imaginary permittivity. As an example, for compositions with increased filler loading (i.e., increased real permittivity) and increased conductivity due to percolation, an increase in dielectric loss (i.e., increases in imaginary permittivity) can be realized. As a further example, the real and imaginary permeability may not change with loading, owing to the non-magnetic nature of the filler material.

Figure 2:
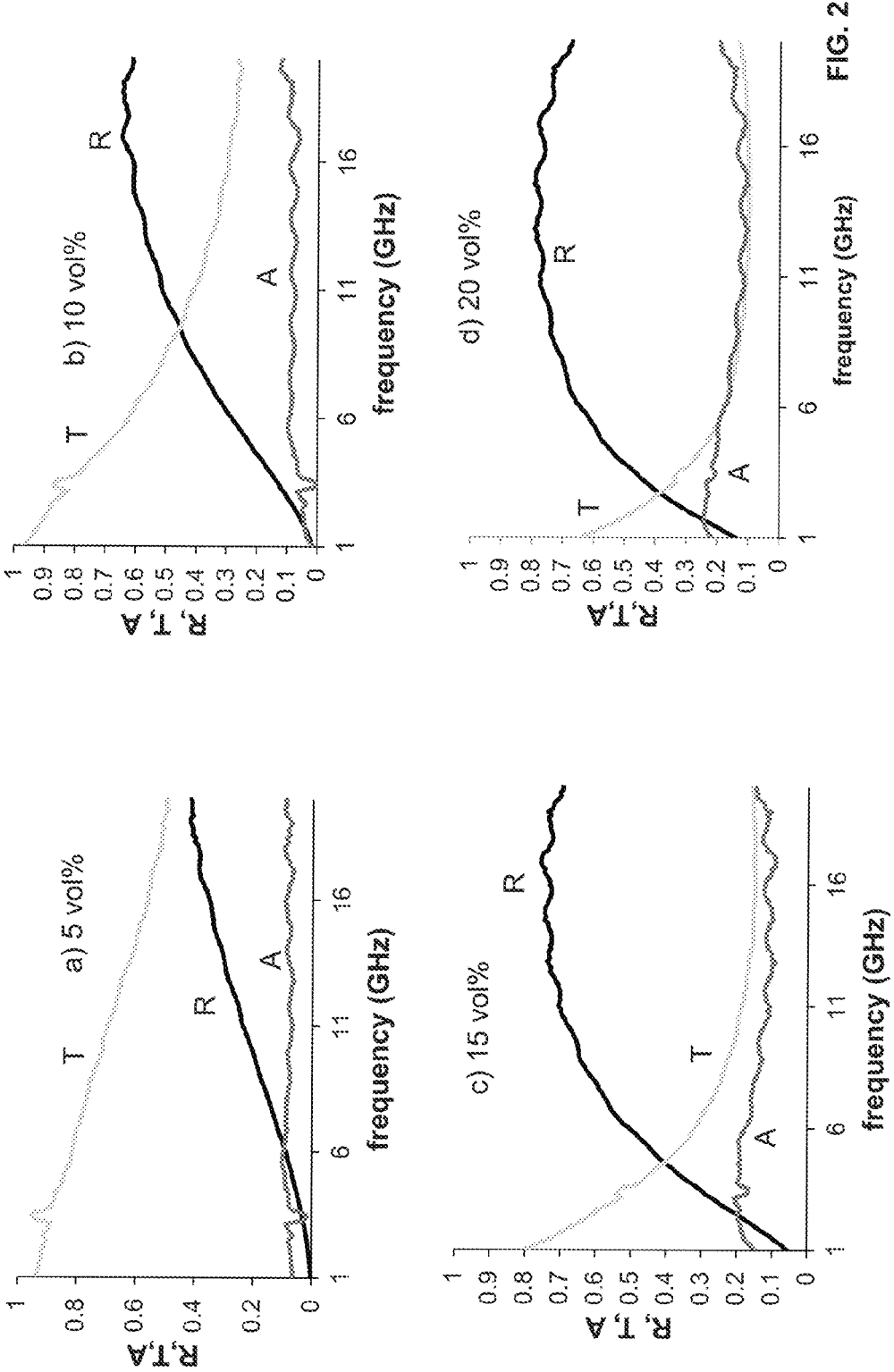
FIG. 2 is a graphical representation of reflection (R), absorption (A), and transmission (T) properties of an exemplary composition comprising various filler loadings from about 5 vol % to about 20 vol % graphene in ABS.
Figure 3:
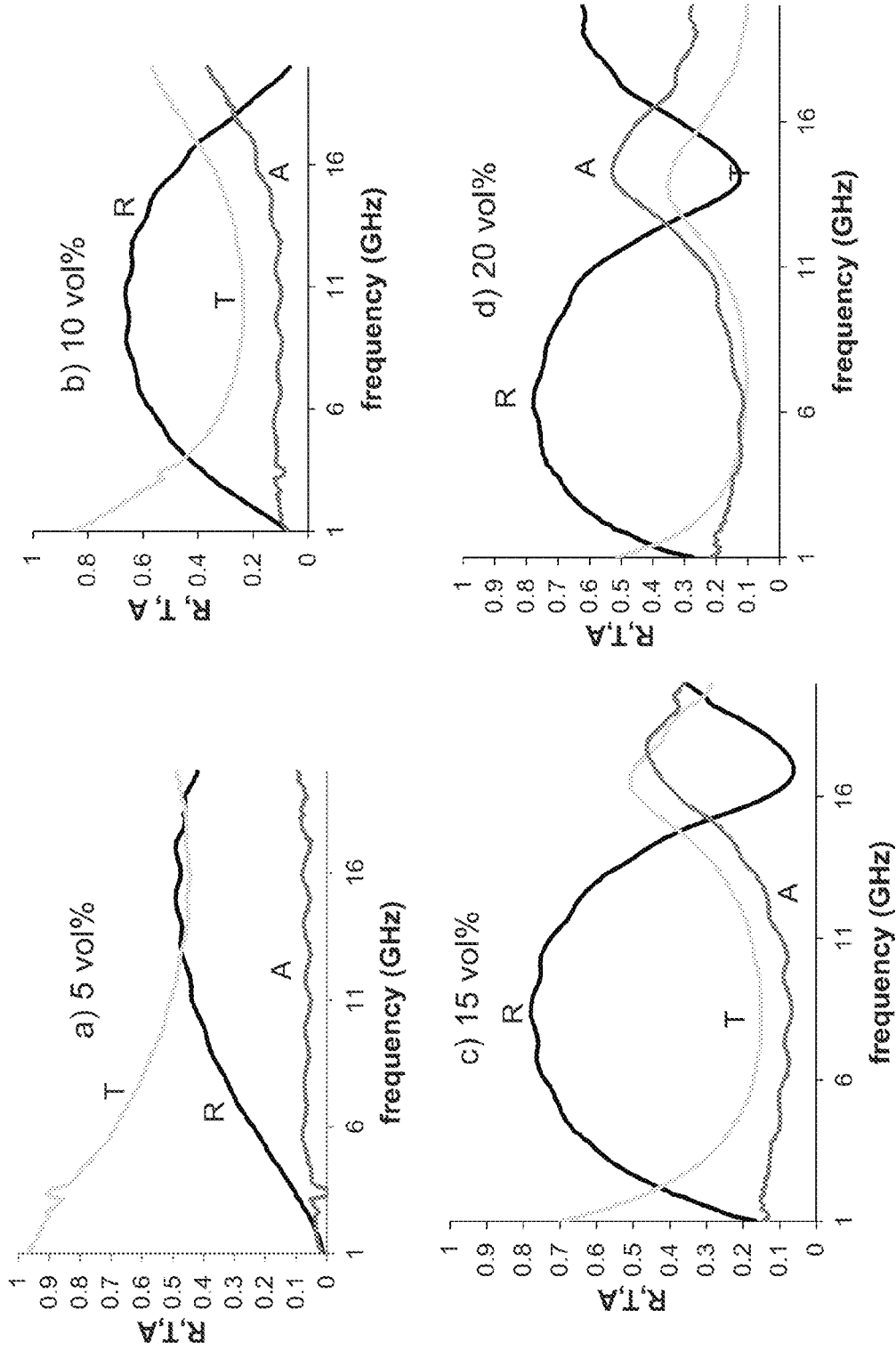
FIG. 3 is a graphical representation of reflection (R), absorption (A), and transmission (T) properties of an exemplary composition comprising various filler loadings from about 5 vol % to about 20 vol % graphene in ABS.

FIGS. 2-3 illustrate graphical representations of reflection (R), absorption (A), and transmission (T) properties of exemplary compositions prepared in accordance with Tables 1-4 and having 1 mm thickness and 2 mm thickness, respectively. In an aspect, increases in filler loadings lead to an increase in reflectivity and absorption with concomitant decreases in transmission in the samples, regardless of composition sample thickness. As an example, destructive interference phenomena can contribute to sample absorption in the high frequency range for compositions (e.g. 2 mm thick 15 vol % and 20 vol % filler loaded samples). As a further example, the Salisbury effect can be used advantageously in multilayer stacks of compositions to provide broadband absorption.

Figure 4:
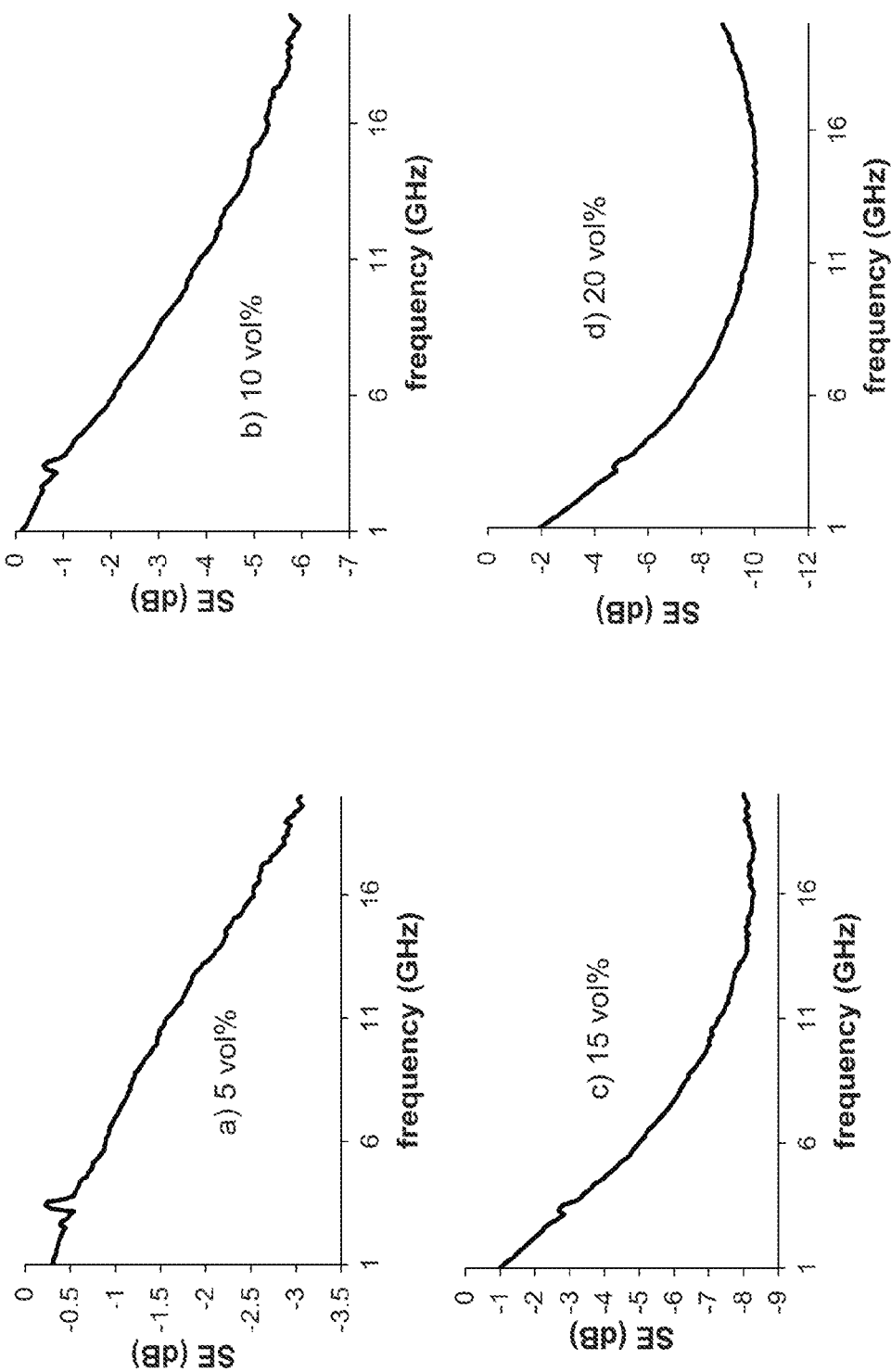
FIG. 4 is a graphical representation of shielding effectiveness properties of an exemplary composition comprising various filler loadings from about 5 vol % to about 20 vol % graphene in ABS.
Figure 5:
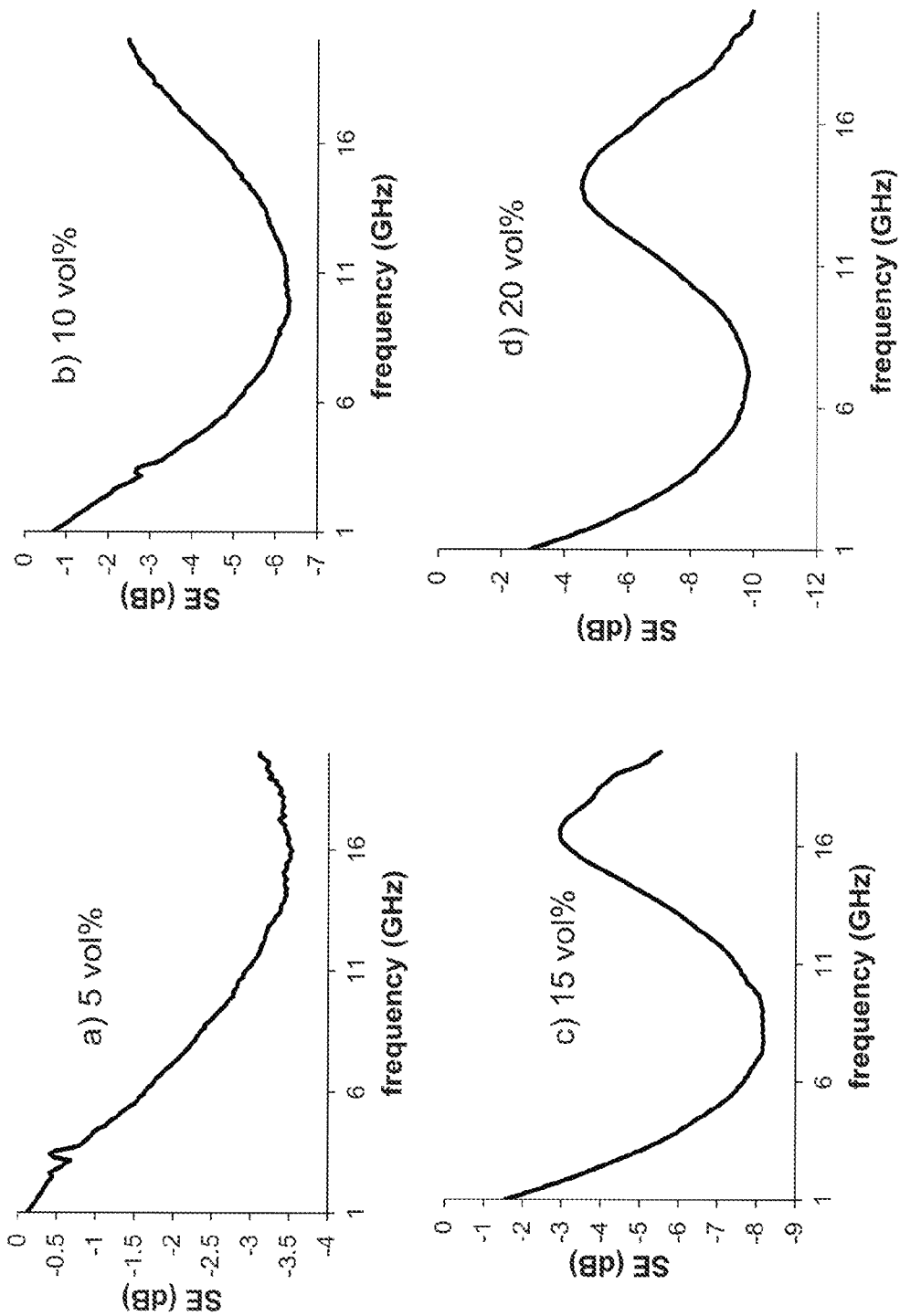
FIG. 5 is a graphical representation of shielding effectiveness properties of an exemplary composition comprising various filler loadings from about 5 vol % to about 20 vol % graphene in ABS.

FIGS. 4-5 illustrate graphical representations of shielding effectiveness properties of exemplary compositions prepared in accordance with Tables 1-4 and having 1 mm thickness and 2 mm thickness, respectively. In an aspect, the overall shielding effectiveness for the 1 mm samples is modest in the low single digit decibel range. As weight loading of the conductive filler increases the shielding effectiveness tends to improve. As an example, increasing sample thickness can decrease transmissivity.

Figure 6:
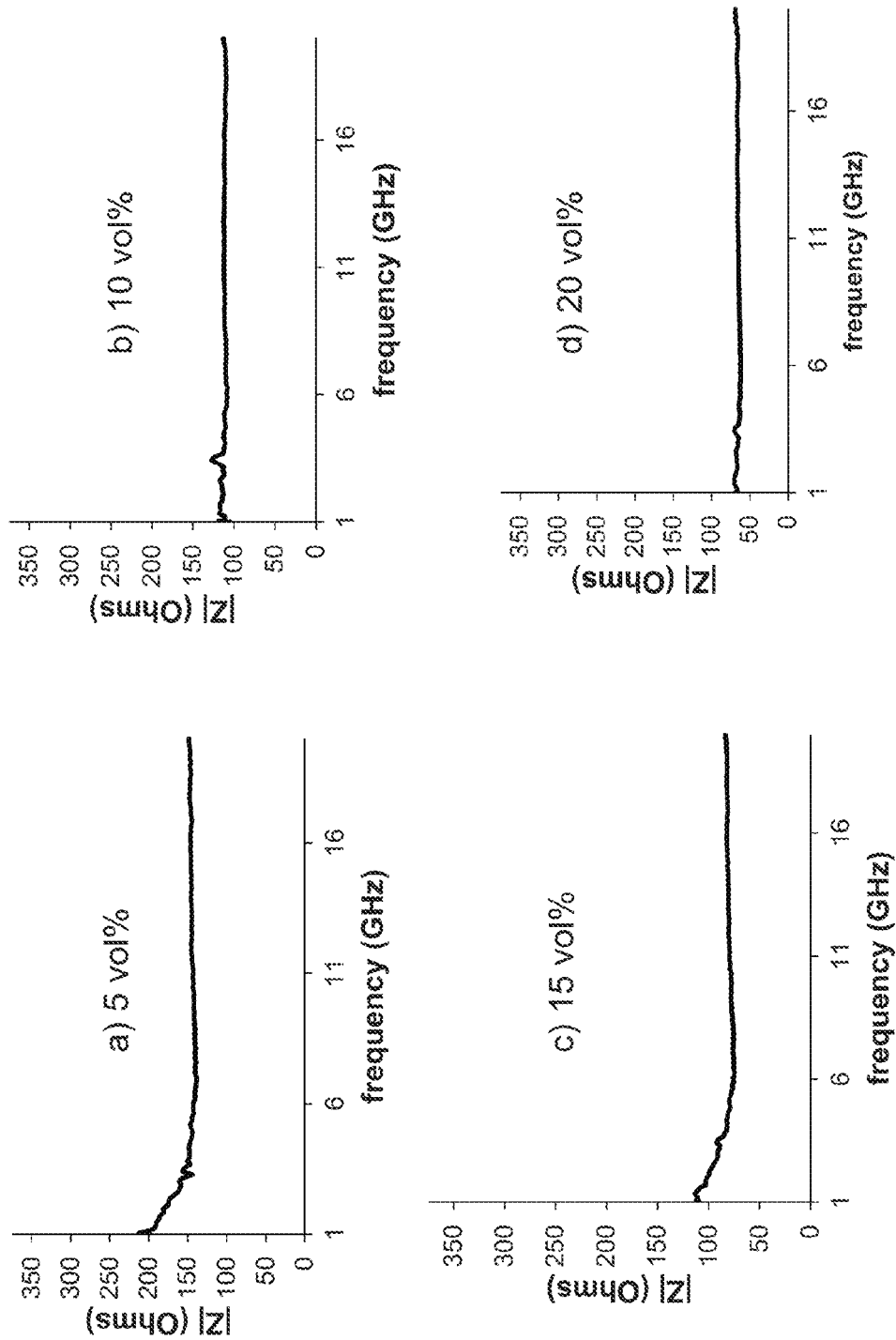
FIG. 6 is a graphical representation of impedance properties of an exemplary composition comprising various filler loadings from about 5 vol % to about 20 vol % graphene in ABS.

FIG. 6 illustrates graphical representations of impedance properties of exemplary compositions prepared in accordance with Tables 1-4. In an aspect, impedance of the composites are generally unaffected by sample thickness, due at least in part to impedance being a function of the ratio of permeability and permittivity of the composite, which is a function of filler volume loading. As an example, as volume loading increases the mismatch between permeability and permittivity increases (i.e., ratio gets smaller). As a further example, since graphene is non-magnetic and electrically conductive only, permittivity increases with loading and becomes very large once the filler in the composite achieves full electrical percolation. Accordingly, impedance of the composite continually decreases with loading (due to the inverse relationship of permittivity to impedance).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A composition for energy dissipation in at least a portion of the frequency range from about 1 GHz to about 20 GHz, the composition comprising:
    a dielectric; and
    graphene blended with the dielectric to form a blended composition, wherein the percentage volume of the graphene relative to the total volume of the composition is configured such that dissipation of incident electromagnetic radiation is substantially optimized in at least a portion of the frequency range from about 1 GHz to about 20 GHz, and wherein at least a portion of the incident electromagnetic radiation is reflected to effect destructive interference.

2. The composition of claim 1, wherein the dielectric comprises a thermoplastic polymer.

3. The composition of claim 1, wherein the percentage volume of the quantity of graphene relative to the total volume of the composition is from about 5% to about 20%.

4. The composition of claim 1, wherein the percentage volume of the quantity of graphene relative to the total volume of the composition is from about 10% to about 20%.

5. The composition of claim 1, wherein the percentage volume of the quantity of graphene relative to the total volume of the composition is from about 15% to about 20%.

6. The composition of claim 1, wherein a thickness of the composition is configured to minimize transmission of the incident electromagnetic radiation.

7. A method of increasing energy dissipation in at least a portion of the frequency range from about 1 GHz to about 20 GHz, the method comprising:
    providing the blended composition of claim 1; and
    receiving at the blended composition incident electromagnetic radiation in at least a portion of the
        frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

8. A blended composition for energy dissipation in at least a portion of the frequency range from about 1 GHz to about 20 GHz, the composition comprising:
    a dielectric; and
    a conductive, non-magnetic filler mixed with at least a portion of the dielectric, wherein the percentage volume of the conductive, non-magnetic filler relative to the total volume of the blended composition is configured such that dissipation of incident electromagnetic radiation is substantially optimized in at least a portion of the frequency range from about 1 GHz to about 20 GHz.

9. The composition of claim 8, wherein percentage volume of the conductive filler relative to the total volume of the composition is configured such that the electrical percolation of the material is substantially optimized in at least a portion of the frequency range from about 1 GHz to about 20 GHz.

10. The composition of claim 8, wherein the dielectric comprises a thermoplastic polymer.

11. The composition of claim 8, wherein the conductive filler comprises a lossy filler.

12. The composition of claim 8, wherein the conductive filler comprises graphene.

13. The composition of claim 8, wherein the percentage volume of the conductive filler relative to the total volume of the composition is from about 5% to about 20%.

14. The composition of claim 8, wherein the percentage volume of the conductive filler relative to the total volume of the composition is from about 10% to about 20%.

15. The composition of claim 8, wherein the percentage volume of the conductive filler relative to the total volume of the composition is from about 15% to about 20%.

16. The composition of claim 8, wherein a thickness of the composition is configured to minimize transmission of incident electromagnetic radiation.

17. A method of increasing energy dissipation in at least a portion of the frequency range from about 1 GHz to about 20 GHz, the method comprising:
   providing the blended composition of claim 8; and
   receiving at the blended composition incident electromagnetic radiation in at least a portion of the
   frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

18. A blended composition for energy dissipation in at least a portion of the frequency range from about 1 GHz to about 20 GHz, the blended composition comprising:
   a dielectric; and
   a conductive filler having variable permittivity and substantially static permeability, wherein the conductive filler is blended via extrusion with at least a portion of the dielectric,
   wherein the percentage volume of the conductive filler relative to the total volume of the blended composition is configured such that dissipation of incident electromagnetic radiation is substantially optimized in at least a portion of the frequency range from about 1 GHz to about 20 GHz, and
   wherein, below full electrical percolation, the reflectivity of the blended composition is minimized.

19. The composition of claim 18, wherein the dielectric comprises a thermoplastic polymer.

20. The composition of claim 18, wherein the conductive filler comprises a lossy filler.

21. The composition of claim 18, wherein the conductive filler comprises graphene.

22. The composition of claim 18, wherein the percentage volume of the conductive filler relative to the total volume of the composition is from about 5% to about 20%.

23. The composition of claim 18, wherein the percentage volume of the conductive filler relative to the total volume of the composition is from about 10% to about 20%.

24. The composition of claim 18, wherein the percentage volume of the conductive filler relative to the total volume of the composition is from about 15% to about 20%.

25. The composition of claim 18, wherein a thickness of the composition is configured to minimize transmission of incident electromagnetic radiation.

26. A method of increasing energy dissipation in at least a portion of the frequency range from about 1 GHz to about 20 GHz, the method comprising:
   providing the blended composition of claim 18; and
   receiving incident electromagnetic radiation at the blended composition in at least a portion of the
   frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

* * * * *